A. CONRADY.
FRUIT AND JELLY MASHERS AND STRAINERS.

No. 181,044. Patented Aug. 15, 1876.

WITNESSES:
John Goethals
Alex F. Roberts

INVENTOR:
A. Conrady
BY
ATTORNEYS.

UNITED STATES PATENT OFFICE.

ADOLPH CONRADY, OF CINCINNATI, OHIO.

IMPROVEMENT IN FRUIT AND JELLY MASHERS AND STRAINERS.

Specification forming part of Letters Patent No. 181,044, dated August 15, 1876; application filed June 26, 1876.

*To all whom it may concern:*

Be it known that I, ADOLPH CONRADY, of Cincinnati, Hamilton county, Ohio, have invented a new and Improved Fruit and Jelly Strainer, of which the following is a specification:

My improved fruit and jelly strainer consists in a metal cup with perforated sides, in which is a press-follower, with a screw for working it, the screw being mounted in a cross-tree, detachably connected to the top of the cup, so as to be readily attached and detached, to facilitate the application and removal of the follower for filling and clearing out the cup.

Figure 1:
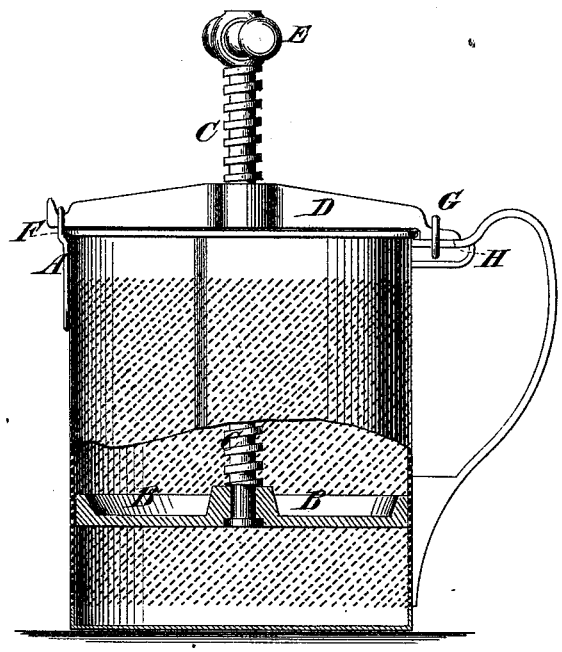
Figure 2:
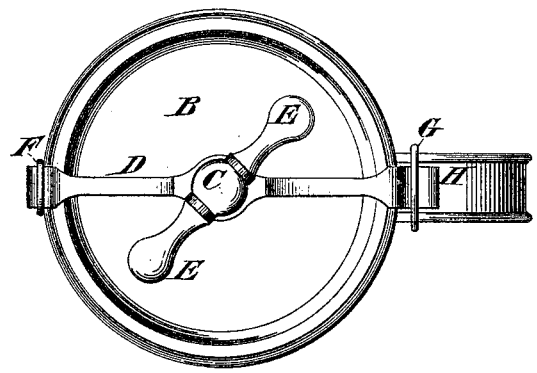

Figure 1 is partly a side elevation, and partly a sectional elevation, of my improved strainer. Fig. 2 is a top view.

Similar letters of reference indicate corresponding parts.

A is a cup, of sheet metal or other approved material, having perforated sides, in which is a press-follower, B, and a screw, C, for working it, the screw being fitted in the cross-tree D, and having a handle, E, for turning it by hand.

The cross-tree B is attachably connected to the top of the cup by hooking into the loop F at one end, and by the link G at the other end, which slides along the handle H on to said end.

The fruit or jelly to be strained is put in the cup when the follower is out, and pressed by screwing down the follower on it after the latter has been applied.

Having thus described my invention, I claim as new and desire to secure by Letters Patent—

1. As a new article of manufacture, the side-perforated metallic cup A, provided with follower, screw, and nut-bar D, as shown and described.

2. The cross-tree D, having the press-screw E fitted to screw up and down in it, and being detachably connected to cup A by loop F, sliding link G, and handle H, substantially as specified.

ADOLPH CONRADY.

Witnesses:
S. B. CARTER,
M. E. QUINN.